Patented May 4, 1948

2,440,711

UNITED STATES PATENT OFFICE 2,440,711

COATED METHYL METHACRYLATE POLYMER AND PROCESS OF MAKING SAME

Max Fredrick Bechtold, Wilmington, Del., assignor to E. I. du Pont de Nemours & Company, Wilmington, Del., a corporation of Delaware No Drawing. Application February 16, 1946, Serial No. 648,211

8 Claims. (Cl. 117—72)

This invention relates to coated methyl methacrylate polymer and, more particularly, to improving the scratch resistance of the surface of methyl methacrylate polymer sheets and the like.

Methods heretofore proposed for modification of the surface of synthetic resins such as methyl methacrylate polymer to improve scratch resistance include: (1) The application of substances having two or more polymerizable olefinic groups per molecule to the surface to be treated; (2) condensation of volatilized hard substances on the surface; (3) application of solutions of metal silicates to the surface, followed by the precipitation of $SiO_2 \cdot xH_2O$, then leaching out the soluble portion of the silicate; (4) application of acid polysilicic acid ester/organic polymer compositions cured by baking; and (5) application of acid polysilicic acid ester/partially hydrolyzed polyvinyl acetate compositions cured by heating under pressure.

Method 1 is limited with respect to the scratch resistance attainable because of the inherent softness of the organic coating materials used. Methods 2 and 3 of film deposition, besides being inconvenient to control, yield films that are porous and too weak to be well suited as scratch resistant coatings. Method 4 involves compositions prepared to take advantage of the superior rigidity of the atomic arrangement in polymers such as inorganic glasses as well as the toughness of linear organic polymers, but curing by baking fails to develop fully the potential scratch resistance and weather resistance of such compositions, especially in the case of coating thermoplastic surfaces, because shrinkage of the surface during curing at high temperature results in cracking. In particular, it is difficult to obtain, by baking alone, a surface on polymethyl methacrylate having the combined properties of optical perfection, high scratch resistance and long range outdoor weather resistance because the curing temperature required to develop the latter two properties usually causes cracking of the coated thermoplastic surface. A further limitation on curing these compositions by baking on thermoplastic surfaces is that attempts to hot-form the coated articles require heating to a temperature which causes cracking of the surface due to further curing of the coating. Curing these compositions by heating under pressure, method 5 above, affords a method of obtaining the desired combination of optical perfection, high scratch resistance and long range outdoor exposure resistance in both flat and curved articles. However, this curing process requires extensive pressure and mold equipment as well as additional manipulations in comparison with baking.

An object of the present invention is to provide an economical and practical method of improving the scratch resistance of the surface of methyl methacrylate polymer. A further object is to provide coatings for various shapes of methyl methacrylate polymer articles, which coatings have high scratch resistance and retain this property as well as clarity and smoothness upon exposure to the weather. Other objects will be apparent from the description of the invention given hereinafter.

The above objects are accomplished according to the present invention by applying to a surface of a solid methyl methacrylate polymer a coating solution comprising ethyl silicate hydrolyzed with at least 18%, by weight thereof, of water, and a polyvinyl butyral resin, heating said coated surface at an elevated temperature to cure the base coat thus formed and bond same to the surface of the polymer, and cooling said base coat, then applying to said base coat a second coating solution comprising ethyl silicate hydrolyzed with at least 18%, by weight thereof, of water, and a partially hydrolyzed polyvinyl acetate, and heating the coated surface at elevated temperature to cure the top coat thus formed and bond same to the surface of said base coat.

More specifically, it is preferred that the base coat solution should comprise a proportion of 40 to 60 parts, by weight, of the polyvinyl butyral resin to 60 to 40 parts of the partially hydrolyzed ethyl silicate calculated as $SiO_2$, and that the top coat solution should comprise partially hydrolyzed vinyl acetate polymer in a proportion of 20 to 40 parts, by weight, to 80 to 60 parts of partially hydrolyzed ethyl silicate calculated as $SiO_2$. Normally, the base coat should be cooled to approximately room temperature before applying the top coat. The shape of the methyl methacrylate polymer may be altered, if desired, by forming during the progress of the curing of the top coat.

The commercially available technical grade ethyl silicate, which is chiefly tetraethyl orthosilicate, is suitable for use in the preparation of the coating solutions of the present invention. Likewise, good commercial grades of polyvinyl butyral resins and of hydrolyzed vinyl acetate polymers are suitable.

The following examples illustrate specific embodiments of the invention, all parts being given by weight and all solutions and mixtures being made at room temperature unless otherwise noted:

EXAMPLE I

This example shows the use of low hydroxy, high viscosity polyvinyl butyral resin and hydrolyzed ethyl silicate in a baked-on base coating and hydrolyzed polyvinyl acetate and hydrolyzed ethyl silicate in a baked-on top coating over this base coating on a methyl methacrylate polymer surface. The polyvinyl butyral resin is incorporated in the hydrolyzed ethyl silicate solution by mixing prepared solutions.

Technical grade ethyl silicate (100 parts) is hydrolyzed by stirring in 69.5 parts of ethyl alcohol and 22.5 parts of 0.1 normal hydrochloric acid. The temperature of this mixture rises spontaneously about 30° C. and is returned to room temperature within about one hour.

A 10% stock solution of 46.8% hydrolyzed polyvinyl acetate of high viscosity (4% solution in 50/50 isopropyl alcohol/water=86.3 centipoises) is prepared by agitating 100 parts of the commercial polymer lumps in a solvent mixture comprising 630 parts of ethyl alcohol and 270 parts of water for about two days or until all lumps of the polymer disappear.

A 10% stock solution of the low hydroxy high viscosity polyvinyl butyral resin (16% of polyvinyl-OH unreacted with butyraldehyde; viscosity of 5% solution in 2B alcohol=75 centipoises) is prepared by mixing 100 parts of the resin in 900 parts of denatured ethyl alcohol at room temperature.

The base coat and top coat solutions are then prepared by mixing the following materials in the amounts and order indicated, the alcohol and acetic acid being added to the base coat solution just before use:

*Base coat solution*

52.50 parts of the polyvinyl butyral resin stock solution
35.00 parts of the hydrolyzed ethyl silicate solution at the age of 88.5 hours
6.25 parts of denatured ethyl alcohol
56.25 parts of glacial acetic acid

*Top coat solution*

32.6 parts of the hydrolyzed polyvinyl acetate stock solution
53.2 parts of the hydrolyzed ethyl silicate solution at the age of 17 hours
14.2 parts of denatured ethyl alcohol
50.0 parts of glacial acetic acid In applying the base coat a panel of methyl methacrylate polymer is immersed, with its greatest dimension in the vertical direction, for two minutes in the base coat solution after this solution has aged 22 hours. Then the panel is withdrawn vertically into the air at 30% relative humidity at 25° C. so that it emerges from the liquid at the rate of 6 linear inches per minute. Next the panel is hung in a vertical position in an oven for 30 minutes maintained at a temperature of 150° C. Then the panel is removed from the oven and allowed to cool to room temperature. The top coat is applied to this panel by immersing it for one minute in the top coat solution after this solution has aged five hours. Then the panel is withdrawn from the solution as in the base coating operation. Next the panel is hung in a vertical position in an oven for five minutes maintained at a temperature of 130° C. At the end of this time the panel is draped over a Bakelite cylinder six inches in diameter, which is lying on its side in the oven, and heated for an additional 40 minutes at 130° C.–132° C. and then cooled.

A crack-free coated panel is obtained which has assumed the curvature of the outside wall of the cylinder. The thus formed transparent curved body has very high resistance to scratching with steel wool. The surface has high resistance to both optical damage and loss of scratch resistance in weathering tests.

EXAMPLE II

This example shows the use of low hydroxy low viscosity polyvinyl butyral resin and hydrolyzed ethyl silicate in a baked-on base coating and hydrolyzed polyvinyl acetate and hydrolyzed ethyl silicate in a baked-on top coating over this base coating on a methyl methacrylate polymer surface. The polyvinyl butyral resin is incorporated in the hydrolyzed ethyl silicate solution by mixing the dry resin in the hydrolyzed silicate solution. Technical grade ethyl silicate (100 parts) is hydrolyzed by stirring in 72 parts of ethyl alcohol and 20 parts of 0.1 normal hydrochloric acid. The temperature of the mixture rises spontaneously about 30° C. and is returned to room temperature within about one hour.

A stock solution comprising the low hydroxy, low viscosity polyvinyl butyral resin (16% of polyvinyl-OH unreacted with butyraldehyde; viscosity of 5% solution in 2B alcohol=22 centipoises) and hydrolyzed ethyl silicate is prepared by mixing 15 parts of the dry resin in 100 parts of the above hydrolyzed ethyl silicate solution which has aged 11 days. These materials are mixed by placing them in a container on rotating rolls for 72 hours. A substantially clear, viscous fluid is obtained.

The base coat solution is then prepared by mixing the following materials in the amounts and order indicated, the alcohol and acetic acid being added just prior to use:

*Base coat solution*

46 parts of the above hydrolyzed ethyl silicate/polyvinyl butyral resin stock solution at the age of 72 hours
54 parts of denatured ethyl alcohol
50 parts of glacial acetic acid A panel of methyl methacrylate polymer is immersed, with its greatest dimension in a vertical position, for two minutes in the base coat solution. Then the panel is withdrawn into the air at 30% relative humidity at 25° C. in a vertical position as inserted and is subjected to a temperature of 152° C.–158° C. for 30 minutes, after which it is allowed to cool at room temperature. After cooling, the top coat is applied to this panel by immersing it for two minutes in the top coat solution of Example I (age three hours and prepared with the hydrolyzed ethyl silicate of Example I at the age of ten days). The panel is withdrawn from this solution and subjected to a temperature of 152° C.–158° C. for 20 minutes.

The resultant plastic panel is superior to bodies coated as in Example I in surface smoothness, shows high resistance to scratching when scoured with wet abrasive powder and retains scratch resistance and optical perfection under severe outdoor exposure conditions for unusually long periods.

It will be understood that the above examples are merely illustrative and that the invention broadly comprises improving the scratch resistance of methyl methacrylate polymer surfaces by applying thereto to form a base coat a solution comprising polyvinyl butyral and hydrolyzed ethyl silicate, and curing the coating thereon, and then applying to said base coat to form a top coat a solution comprising partially hydrolyzed polyvinyl acetate and hydrolyzed ethyl silicate, and curing said top coat on said base coat.

The invention is applicable to surfaces of either unmodified or modified methyl methacrylate polymer, the particular modification of the methyl methacrylate polymer, within reason, being substantially immaterial.

Polyvinyl butyral/hydrolyzed ethyl silicate compositions of 45/55 to 55/45, by weight, wherein the ethyl silicate is calculated as $SiO_2$, for example about 50/50, are preferred as the base coat from the standpoint of the combined properties of clarity, heat stability, adhesion, ease of preparation and application, ready curing to solvent insoluble condition, formability, resistance to cracking during top coat curing and for high contribution to scratch resistance. However, base coat compositions of polyvinyl butyral/$SiO_2$ in the range of 40/60–60/40 are suitable. Base coat compositions of polyvinyl butyral/$SiO_2$ richer in the $SiO_2$ than about 40/60, by weight, tend to be too rigid and thermosetting in themselves to be suitable as base coats, and are less efficient than the 50/50 compositions in preventing cracking of the top coat during curing because of further curing of the base coat itself; whereas base coats poorer in the $SiO_2$ than about 60/40 tend to be undesirable because of insufficient resistance to cracking during baking, of the top coat. In addition, adhesion of base coats to the surfaces of methyl methacrylate polymer is poorer in this lower range, especially when high hydroxyl polyvinyl butyral is used.

Relatively high hydroxyl polyvinyl butyrals such as those having up to about 28% of the polyvinyl alcohol groups unreacted with butyraldehyde are useful in the base coat but are not so desirable as the low hydroxy resins, such as those having less than about 20% of the polyvinyl alcohol groups unreacted, because higher curing temperatures are required with high hydroxyl resin to bring the resultant resin/$SiO_2$ base coat to a state of insolubility in the top coat solution. Furthermore, adherent compositions having other properties at an optimum for base coating are more difficult to prepare with high hydroxyl polyvinyl butyrals. Polyvinyl butyral resins having 16% and less of the polyvinyl alcohol groups unreacted with butyraldehyde are preferred.

The polyvinyl butyral resin may be incorporated in the hydrolyzed ethyl silicate solution by mixing prepared solutions as in Example I or by mixing the dry polyvinyl butyral resin in the hydrolyzed ethyl silicate solution as in Example II. The latter method of solution is preferred because of improved smoothness of the resultant base coat. The base coat solution can be used immediately after preparation, but base coats of poor adhesion are produced from solutions aged over about six days at room temperature.

The amount of water required for the hydrolysis of ethyl silicate used in preparing the base coat solution is at least 18%, by weight, of the ethyl silicate. Preferably, the ethyl silicate will be hydrolyzed with at least 20%, by weight thereof, of water. Although ethyl silicate hydrolyzed with 18%–75%, by weight thereof, of water is useful, ethyl silicate hydrolyzed with 20%–45% of water is preferred. Too low a degree of hydrolysis may result in insufficient rigidity in the final polyvinyl butyral/silica base coat, whereas too high a degree of hydrolysis may result in more difficult solubility of the polyvinyl butyral resin in the hydrolyzate as well as reduced adhesion of coatings.

Curing of the base coat on the methyl methacrylate polymer sheets is most conveniently done immediately after withdrawal and may be completed as briefly as 15 minutes at 140° C. or even as rapidly as 10 minutes at 175° C.; however, to insure insolubility in the top coat solution, curing for 30 minutes at 150° C. is preferred. Normally, curing will be completed in from 10 to 30 minutes at a temperature from 140° C. to 175° C.

A thickness of the polyvinyl butyral/$SiO_2$ base coat applied in one layer in the range of about 1–3 microns is optimum for the purpose of this invention. Thicker single layers are more difficult to apply without interfering somewhat with surface smoothness although they may be used. Several thin layers may be applied without materially increasing the crack resistance efficiency after 3 microns total base coat thickness is exceeded. While with increasing total thickness of the base coat layer there is considerable gain in resistance of the resultant top-coated multicoat system to abrasion by heavily loaded objects, it is at the expense of introducing slight optical degradation in the form of dust and lint particles with each layer. Consequently, it is preferred to limit the total number of base coat layers to 3 and the total thickness of 10 microns. Base coats with a total thickness less than about 0.5 micron make only a small contribution to improved final coatings.

The top coat may be applied to the methyl methacrylate polymer base coated sheet at any time from just after cooling the cured base coated sheet to several months or more, since the base coat is highly resistant to exposure and its properties are stable with time.

Weight ratios of partially hydrolyzed polyvinyl acetate to hydrolyzed ethyl silicate, calculated as $SiO_2$, in the top coat solution in the range of approximately 20/80 to 40/60 are useful. Weight ratios of 25/75 to 35/65, for example about 29/71, are preferred. Compositions materially richer in silica than 20/80 tend to crack in curing, while those substantially under about 40/60 are not consistently adherent and may have poorer scratch resistance.

Preparation of the top coat solution requires, as in the case of the base coat solution, hydrolyzates of ethyl silicate prepared with at least 18%, by weight thereof, of water. Preferably the ethyl silicate used will be hydrolyzed with at least 20% of water. Although ethyl silicate hydrolyzed with 18%–75%, by weight thereof, of water is useful, ethyl silicate hydrolyzed with 20%–45% of water is preferred. Too low a degree of hydrolysis produces less than the maximum scratch resistance. Too high a degree of hydrolysis yields a more completely cured top coat that retains hardness for longer periods in hot water and resists crazing during weathering for a longer period, but these advantages may be more than offset by poorer adhesion and greater tendency toward cracking during curing of the top coat.

An essential component of the top coat composition of this invention is the partially hydrolyzed vinyl ester polymer. While other vinyl esters may be used, vinyl acetate is generally satisfactory and is the most readily available. It is preferred to use polyvinyl acetates that are hydrolyzed from 45% to 55% (that is from 45% to 55% of the acetyl groups have been removed) for the optimum combination of abrasion and weather resistance and adhesion to the base coat. However, unmodified polyvinyl acetate hydrolyzed anywhere from substantially zero to substantially complete hydrolysis can be used and, likewise, wide variation in the relative viscosity of the polyvinyl acetate is permissible. Practically, a polyvinyl acetate hydrolyzed to at least 20% would be used in most instances since the lower hydrolyzed polyvinyl acetates, while yielding coatings with excellent adhesion, apparently do not cross link as completely and as irreversibly with the silicic acid as do the polyvinyl acetates hydrolyzed to a greater degree, with the result that the coatings are inferior in scratch resistance and weather resistance. On the other hand, polyvinyl acetate hydrolyzed in excess of 90% tends to cause some difficulty with respect to adherence of the top coat film to the base coat.

The present invention is not restricted to the use of unmodified vinyl acetate polymer in the top coat composition as certain chemical modifications of the vinyl acetate polymer are possible with retention of excellent coating properties. For example, ethylene/vinyl acetate interpolymers with a mol ratio of 1/20 can be used directly with practically no hydrolysis. Also, substantially completely hydrolyzed ethylene/vinyl acetate interpolymer with a mol ratio of 1/1 to 1/3.3 may also be used. In general, stable interpolymers containing vinyl acetate in large proportion can be substituted for unmodified polyvinyl acetate providing that a satisfactory solvent vehicle can be found which will maintain the resin and the hydrolyzed ethyl silicate compatible in solution and during baking.

The top coat is applied by practically the same procedure as the base coat, but the baking should be adjusted with a view to obtaining maximum curing without cracking the surface. In general, it is satisfactory to bake for 15 minutes to 45 minutes at 120° C. to 140° C. However, as in Example II, it is possible under some conditions to bake at 150° C. and higher for at least 20 minutes without cracking. Adequate curing is generally obtained by baking 30 minutes at 135° C. and it is not advisable to exceed 170° C. under normal conditions.

The thickness of the top coat normally will be from 0.5–10 microns and preferably from 1–3 microns. Thin coatings tend to be less scratch resistant, while thick coatings tend to be less resistant to cracking during weathering. The most advantageous thickness can be determined for any particular case.

If the top coated methyl methacrylate polymer sheet is to be shaped, the optimum point of time during curing of the top coat for this process is a function both of the rate of softening and the thickness of the base material and the rate of curing of the top coat. One is prevented from placing the sheet against any kind of a form just after dipping because the surface of the sheet is still tacky. However, for shaping simple curves, sheets may be hung in the oven at the start of curing so that gravitational strain alone will result in such a rate of deformation that the final desired shape is produced without cracking the surface. In general, there exists a period of time during curing of the top coat in which a considerable degree of forming may be realized without crazing the top coat or otherwise damaging the desired properties of the surfaces. It is best to determine the location of the optimum forming period by small scale simple experiments as those skilled in the art will appreciate.

As shown in the examples, the methyl methacrylate polymer sheet or the like may be coated by dipping in the coating solutions, this method being desirable in that good control of the thickness of the coating deposited may be governed by the rate of withdrawal of the sheet from the coating solution. But the invention is by no means limited to this particular method of coating and various other well known coating methods may be employed such as brushing, spraying, or squeegeeing.

The two-layer coating process of this invention is peculiarly adapted to the production of colored methyl methacrylate polymer surfaces protected from weathering and abrasion because dyes or pigments may be incorporated in the base coat composition to give the desired color effect without adding coloring matter or in any way altering the top coat composition.

The present invention is particularly useful for the preparation of curved or flat improved scratch resistant methyl methacrylate polymer articles such as aircraft windows and turrets, automobile windshields, skylight domes, enclosures on watercraft, windows for houses, show windows and show cases, goggle lenses, instrument panels, signal lamp lenses and enclosures, and objects of art.

An entirely unobvious and unexpected feature of the present invention is the fact that although alone the base coat contributes little to the scratch resistance of the surfaces of a methyl methacrylate polymer article, nevertheless, in combination with the top coat the scratch resistance of the surfaces is improved greatly and substantially as much as if the coatings consisted entirely of the top coat composition. The presence of the base coat enables the top coat to be cured at temperatures of about 120–170° C. without cracking, whereas in the absence of the base coat the top coat cracks when heated above 100–105° C. The higher temperature of curing for the top coat contributes materially to the scratch resistance of the coated surfaces.

As many apparently widely different embodiments of this invention may be made without departing from the spirit and scope thereof, it is to be understood that the invention is not limited to the specific embodiments thereof except as defined in the appended claims.

I claim:

1. Process of providing a solid methyl methacrylate polymer with improved surface characteristics which process comprises applying to a surface of said polymer a coating solution comprising ethyl silicate hydrolyzed with 18%–75%, by weight thereof, of water, and a polyvinyl butyral resin, heating said coated surface at 140° C.–175° C. to cure the base coat thus formed and bond same to the surface of said polymer, cooling said base coat, then applying to said base coat a second coating solution comprising ethyl silicate hydrolyzed with 18%–75%, by weight thereof, of water, and a vinyl acetate polymer hydrolyzed from 20%–90%, and heating the coated surface at elevated temperature to cure the top coat thus formed and bond same to the surface of said base coat.

2. Process of providing a solid methyl methacrylate polymer with improved surface characteristics which process comprises applying to a surface of said polymer a coating solution comprising ethyl silicate hydrolyzed with 18%–75%, by weight thereof, of water, and a polyvinyl butyral resin in a proportion of 40–60 parts, by weight, to 60–40 parts of said ethyl silicate calculated as SiO₂, heating said coated surface at 140° C.–175° C. to cure the base coat thus formed and bond same to the surface of said polymer, cooling said surface, then applying to said base coat a second coating solution comprising ethyl silicate hydrolyzed with 18%–75%, by weight thereof, of water, and a vinyl acetate polymer hydrolyzed from 20%–90%, in a proportion of 20–40 parts, by weight, to 80–60 parts of said ethyl silicate calculated as SiO₂, and heating said coated surface at 120° C.–170° C. to cure the top coat thus formed and bond same to the surface of said base coat.

3. Process of providing a solid methyl methacrylate polymer with improved surface characteristics which process comprises applying to a surface of said polymer a coating solution comprising ethyl silicate hydrolyzed with 20%–45%, by weight thereof, of water, and a polyvinyl butyral resin in a proportion of 40–60 parts, by weight, to 60–40 parts of said ethyl silicate calculated as SiO₂, heating said surface at 140° C.–175° C. to cure the base coat thus formed and bond same to said surface of said polymer, cooling said surface, then applying to said base coat surface a second coating solution comprising ethyl silicate hydrolyzed with 20%–45%, by weight thereof, of water, and polyvinyl acetate hydrolyzed from 20%–90%, in a proportion of 20–40 parts, by weight, to 80–60 parts of said ethyl silicate calculated as SiO₂, and heating said coated surface at 120° C.–170° C. to cure the top coat thus formed and bond same to the surface of said base coat.

4. Process of providing a solid methyl methacrylate polymer with improved surface characteristics which process comprises applying to a surface of said polymer a coating solution comprising ethyl silicate hydrolyzed with 20%–45%, by weight thereof, of water, and a polyvinyl butyral resin in a proportion of 45–55 parts, by weight, to 55–45 parts of said ethyl silicate calculated as SiO₂, heating said surface at 140° C.–175° C. to cure the base coat thus formed and bond same to the surface of said polymer, cooling said surface, then applying to said base coat a second coating solution comprising ethyl silicate hydrolyzed with 20%–45%, by weight thereof, of water, and polyvinyl acetate hydrolyzed from 20%–90%, in a proportion of 20–40 parts, by weight, to 80–60 parts of ethyl silicate calculated as SiO₂, and heating said coated surface at 120° C.–170° C. to cure the top coat thus formed and bond same to the surface of said base coat.

5. Process of providing a solid methyl methacrylate polymer with improved surface characteristics which process comprises applying to a surface of said polymer a coating solution comprising ethyl silicate hydrolyzed with 20%–75%, by weight thereof, of water, and a polyvinyl butyral resin having less than 28% of its polyvinyl alcohol groups unreacted, in a proportion of 40–60 parts, by weight, to 60–40 parts of said ethyl silicate calculated as SiO₂, heating said surface at 140° C.–175° C. to cure the base coat thus formed and bond same to the surface of said polymer, cooling said surface, then applying to said base coat a second coating solution comprising ethyl silicate hydrolyzed with 20%–75%, by weight thereof, of water, and polyvinyl acetate hydrolyzed from 45%–55%, in a proportion of 25–35 parts, by weight, to 75–65 parts of said ethyl silicate calculated as SiO₂, and heating said surface at 120° C.–170° C. to cure the top coat thus formed and bond same to the surface of said base coat.

6. Process of providing a solid methyl methacrylate polymer with improved surface characteristics which process comprises applying to a surface of said polymer a coating solution comprising ethyl silicate hydrolyzed with 20%–45%, by weight thereof, of water, and a polyvinyl butyral resin having less than 20% of its polyvinyl alcohol groups unreacted, in a proportion of 45–55 parts, by weight, to 55–45 parts of said ethyl silicate calculated as SiO₂, heating said surface at 140° C.–175° C. to cure the base coat thus formed and bond same to the surface of said polymer, cooling said surface, then applying to said base coat a second coating solution comprising ethyl silicate hydrolyzed with 20%–45%, by weight thereof, of water, and polyvinyl acetate hydrolyzed from 45%–55%, in a proportion of 25–35 parts, by weight, to 75–65 parts of said ethyl silicate calculated as SiO₂, and heating said coated surface at 120° C.–170° C. to cure the top coat thus formed and bond same to the surface of said base coat.

7. A solid methyl methacrylate polymer having bonded thereto an improved surface film of 1–20 microns in thickness, said film comprising a base coat of 0.5–10 microns in thickness having been deposited from a solution comprising ethyl silicate hydrolyzed with 18%–75%, by weight thereof, of water, and a polyvinyl butyral resin in a proportion of 40–60 parts, by weight, to 60–40 parts of said ethyl silicate calculated as SiO₂, and having been cured at 140° C.–175° C., and a top coat of 0.5–10 microns in thickness having been deposited on said base coat, after curing same, from a second solution comprising ethyl silicate hydrolyzed with 18%–75%, by weight thereof, of water, and a vinyl acetate polymer hydrolyzed from 20%–90%, in a proportion of 20–40 parts, by weight, to 80–60 parts of ethyl silicate calculated as SiO₂, and having been cured at 120° C.–170° C.

8. A solid methyl methacrylate polymer having bonded thereto an improved surface film of 2–6 microns in thickness, said film comprising a base coat of 1–3 microns in thickness having been deposited from a solution comprising ethyl silicate hydrolyzed with 20%–45%, by weight thereof, of water, and a polyvinyl butyral resin in a proportion of 45–55 parts, by weight, to 55–45 parts of said ethyl silicate calculated as SiO₂, and having been cured at 140° C.–175° C., and a top coat of 1–3 microns in thickness having been deposited on said base coat, after curing same, from a second solution comprising ethyl silicate hydrolyzed with 20%–45%, by weight thereof, of water, and polyvinyl acetate hydrolyzed from 45%–55% in a proportion of 25–35 parts, by weight, to 75–65 parts of said ethyl silicate calculated as SiO₂, and having been cured at 120° C.–170° C.

MAX FREDRICK BECHTOLD.

REFERENCES CITED

The following references are of record in the file of this patent:

UNITED STATES PATENTS

| Number | Name | Date |
| --- | --- | --- |
| 2,404,357 | Bechtold | July 23, 1946 |
| 2,404,426 | Bechtold et al. | July 23, 1946 |

Certificate of Correction

Patent No. 2,440,711.  May 4, 1948.

MAX FREDRICK BECHTOLD

It is hereby certified that errors appear in the printed specification of the above numbered patent requiring correction as follows: Column 3, line 6, for "siilcate" read *silicate*; column 6, line 30, for "of 10 microns" read *to 10 microns*; and that the said Letters Patent should be read with these corrections therein that the same may conform to the record of the case in the Patent Office.

Signed and sealed this 29th day of June, A. D. 1948.

[SEAL]

THOMAS F. MURPHY,
*Assistant Commissioner of Patents.*